US012769261B2

(12) United States Patent
Yang

(10) Patent No.: US 12,769,261 B2
(45) Date of Patent: Oct. 20, 2026

(54) DETECTION DEVICE AND ROTATION DETECTING METHOD FOR THE CROWN OF SMART WATCH

(71) Applicant: Maxic Technology Incorporated, Beijing (CN)

(72) Inventor: Zhixun Yang, Beijing (CN)

(73) Assignee: Maxic Technology Incorporated, Beijing (CN)

( * ) Notice: Subject to any disclaimer, the term of this patent is extended or adjusted under 35 U.S.C. 154(b) by 372 days.

(21) Appl. No.: 18/428,602

(22) Filed: Jan. 31, 2024

(65) Prior Publication Data

US 2024/0337987 A1 Oct. 10, 2024

(30) Foreign Application Priority Data

Apr. 10, 2023 (CN) ......................... 202310373942.3
Apr. 10, 2023 (CN) ......................... 202310374030.8

(51) Int. Cl.
*G04G 21/02* (2010.01)
*G01B 11/26* (2006.01)
*G04G 17/06* (2006.01)

(52) U.S. Cl.
CPC ............. *G04G 21/02* (2013.01); *G01B 11/26* (2013.01); *G04G 17/06* (2013.01)

(58) Field of Classification Search
CPC ......... G04G 21/00; G04G 21/02; G04C 3/146
See application file for complete search history.

(56) References Cited

U.S. PATENT DOCUMENTS

| | | | | |
|---|---|---|---|---|
| 11,327,445 | B2 * | 5/2022 | Kato | G01D 5/252 |
| 2017/0147093 | A1 * | 5/2017 | Funase | G06F 3/04845 |
| 2018/0067459 | A1 * | 3/2018 | Chung | G04C 3/005 |
| 2020/0103830 | A1 * | 4/2020 | Kato | G04G 21/00 |
| 2022/0412775 | A1 * | 12/2022 | Eom | G01R 33/0035 |
| 2024/0160157 | A1 * | 5/2024 | Oh | G06F 3/0362 |

* cited by examiner

*Primary Examiner* — Edwin A. Leon
*Assistant Examiner* — Jason M Collins
(74) *Attorney, Agent, or Firm* — Lerner David LLP

(57) ABSTRACT

A detection device and a rotation detecting method for the crown of a smart watch are provided. Operations on the crown include a pressing action and a rotation action. The method includes: detecting the rotation angle of the crown within a set period of time when the pressing action is identified to obtain a measured rotation angle; and eliminating a misrotation angle from the measured rotation angle, to obtain a true rotation angle corresponding to the rotation action, and taking the true rotation angle as a detection result.

20 Claims, 6 Drawing Sheets

DETECTION DEVICE AND ROTATION DETECTING METHOD FOR THE CROWN OF SMART WATCH

CROSS REFERENCE TO RELATED APPLICATIONS

This disclosure claims priority from Chinese patent application No. 202310373942.3, filed on Apr. 10, 2023, at the China National Intellectual Property Administration (CNIPA), entitled "Detection device for the Crown of Smart Watch", and the Chinese patent application No. 202310374030.8, filed on Apr. 10, 2023, at CNIPA, entitled "Detection device and Rotation Detecting Method for the Crown of Smart Watch", which are incorporated herein by reference in entirety.

TECHNICAL FIELD

The present disclosure relates to the technical field of smart watches, and particularly to a detection device and a rotation detecting method for the crown of a smart watch.

BACKGROUND

In the era of intelligence of watches, there are two directions. One is complete intelligence, tending to electronic watches, and even simulating a physical hand with an electronic hand. The other is semi-intelligence, i.e., retaining an entity hand, and adding an intelligent module. In terms of user experience, watches with physical hands provide better appearance, deliver an enhanced user experience, and can improve the precision of crown rotation angle detection by adopting encoder or opto-sensor.

However, when pressing the crown, i.e., when performing a key-pressing operation on the crown, jittering of human hand, shaking of the crown itself or the like is inevitable, which will cause misrotation of a shaft of the crown, and affect the detection accuracy of the rotation angle of the crown.

Besides, in order to design an intelligent module including various sensors inside the watch, it is necessary to simplify the gearbox of the pointer transmission unit of the watch. In the prior art, mechanical encoders occupy a large volume and suffer from low angular recognition precision for rotational movements.

SUMMARY

Embodiments of the present disclosure provide a detection device and a rotation detecting method for the crown of a smart watch.

In an embodiment of the present disclosure, a rotation detecting method for a crown is provided, wherein operations on the crown include a pressing action and a rotation action, and the method includes:

- detecting, within a set period of time when the pressing action is identified, a rotation angle of the crown to obtain a measured rotation angle; and
- eliminating a misrotation angle from the measured rotation angle to obtain a true rotation angle corresponding to the rotation action which is taken as the detection result.

In an embodiment of the present disclosure, a detection device for the crown of a smart watch further provided, wherein operations on the crown comprise a pressing action and a rotation action, and the detection device includes:

- an angle measuring module, configured to detect a rotation angle of the crown to obtain a measured rotation angle;
- a pressing detection module, configured to detect a pressing action on the crown; and
- a rotation detection module, connected to the angle measuring module and the pressing detection module, and configured to eliminate, within a set period of time when the pressing action is identified, a misrotation angle from the measured rotation angle to obtain a true rotation angle corresponding to the rotation action, which is taken as a detection result.

BRIEF DESCRIPTION OF DRAWINGS

In order to more clearly illustrate technical solutions of embodiments in the present disclosure, drawings that need to be used in the embodiments will be introduced briefly below. It should be understood that the drawings below merely show some embodiments of the present disclosure, and therefore should not be considered as limitation to the scope. Those ordinarily skilled in the art could also obtain other relevant drawings according to these drawings without using any inventive efforts.

DETAILED DESCRIPTION OF EMBODIMENTS

Figure 1:
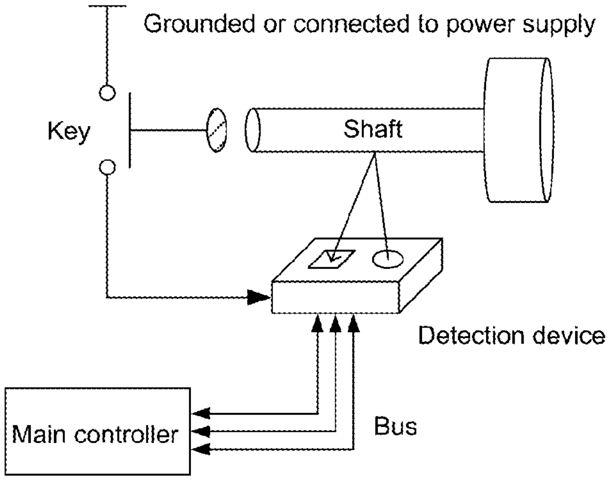
FIG. 1 is a structural schematic diagram of an existing detection device for a crown.

In order to elucidate the objectives, examples, and advantages of the present disclosure more, the embodiments in the present disclosure will be described clearly and in detail below with reference to the drawings in the embodiments of the present disclosure. Obviously, the embodiments described are merely some but not all embodiments of the present disclosure. Generally, components in the embodiments of the present disclosure described and shown in the drawings herein may be arranged and designed in various different configurations.

For application of a crown, as the crown needs to perform both a rotating function and a pressing function through a shaft, in an existing crown detection device, as shown in FIG. 1, a main controller needs to be connected to an encoder near the shaft to identify a rotation signal, and also needs to be connected to a key near the shaft for detecting a trigger signal of the key. Thus, requirements for a pin of the main controller are high, and meanwhile resource consumption for pressing detection on the main controller is introduced. In smart watch system application, the main controller and the shaft are often far away from each other, then a connection line between the main controller and the key occupies structural space in the system. In addition, since the pressing detection and the rotation detection are separately accomplished by the main controller and the encoder, the encoder, after detecting the rotation, still needs to send this signal to the main controller through connection with the main controller, when pressing is triggered, it is directly detected by the main controller, thus, there exists an uncertain time difference between the two detections.

One or more embodiments of the present disclosure provide a detecting device for the crown of a smart watch to solve the following problems: 1) in the conventional solution with a mechanical encoder, the mechanical encoder occupies a large volume, and has a low accuracy to identify the rotation angle; 2) system cost is increased and structural space layout is disadvantageous, as the main controller needs to be provided with the pin for detecting the key and the connection line between the pin and the key; 3) the pressing detection on the main controller consumes computing resources of the main controller; and 4) a time difference exists between the pressing detection and the rotation detection.

Figure 2:
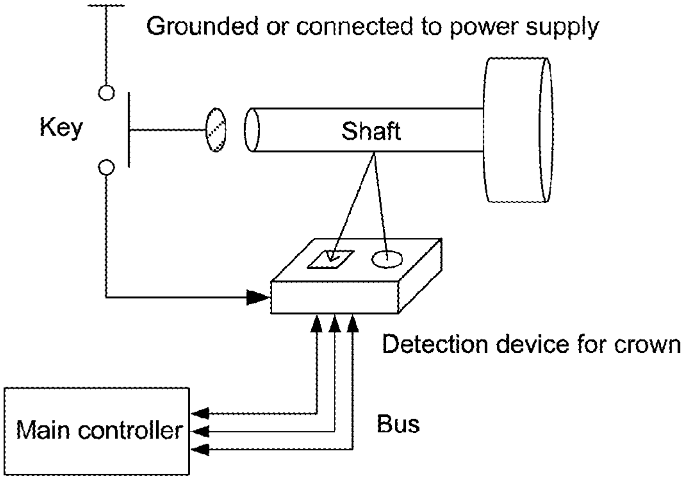
FIG. 2 is a schematic diagram of the crown of a smart watch provided in an embodiment of the present disclosure.

Referring to FIG. 2, FIG. 2 is a schematic diagram of the crown of a smart watch provided in an embodiment of the present disclosure. The crown includes a key and a shaft. A pressing action on the crown can be detected by detecting a key state. A rotation angle of a rotation action on the crown can be obtained by detecting a rotation angle of the shaft. In the present embodiment, user's pressing action and rotation action on the crown are detected by the detection device. A detection result of the detection device is transmitted to a main controller 5 of the smart watch via a bus.

Figure 3:
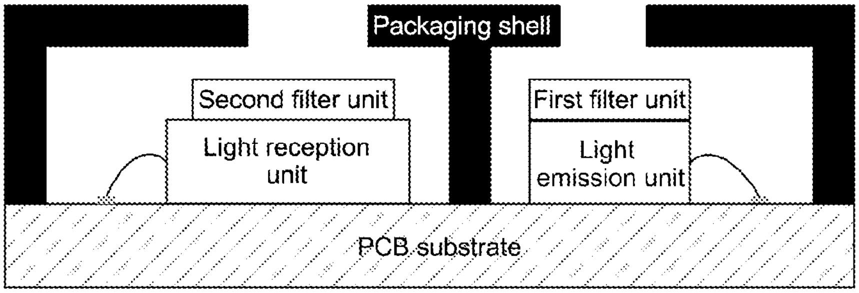
FIG. 3 is a structural schematic diagram of a detection device for the crown of a smart watch provided in an embodiment of the present disclosure.

Referring to FIG. 3, FIG. 3 is a schematic diagram of a detection device for the crown of a smart watch provided in an embodiment of the present disclosure. User's operations on the crown include the pressing action and the rotation action. The detection device is configured to detect the user's pressing action and rotation action.

The detection device in the present embodiment specifically includes an angle measuring module 1, a pressing detection module 4, and a rotation detection module 2.

In the above, the angle measuring module 1 is configured to detect a rotation angle of the crown, to obtain a measured rotation angle. The pressing detection module 4 is configured to detect the pressing action on the crown. The rotation detection module 2 is connected to the angle measuring module 1 and the pressing detection module 4. The rotation detection module 2 is configured to eliminate, within a set period of time during which the pressing action has a continuous impact on the rotation detection when the pressing action is identified, a misrotation angle from the measured rotation angle to obtain a true rotation angle corresponding to the rotation action, and take the true rotation angle as the detection result.

In embodiments of the present disclosure, considering factors such as jittering of human hand or shaking of the crown itself when the crown is pressed, the misrotation of the shaft of the crown occurs. Since the misrotation is not a correct rotation action, accurate rotation angle data can only be provided by eliminating the misrotation. Therefore, in the present embodiment, the misrotation angle is eliminated by the rotation detection module 2 from all the measured rotation angles detected by the angle measuring module, within the set period of time when the pressing detection module 4 identifies the pressing action on the crown, so as to obtain the true rotation angle corresponding to the rotation action, thus improving the detection accuracy of the rotation angle of the crown, wherein the set period of time is a period in which the pressing action continuously affects the rotation detection.

Figure 4:
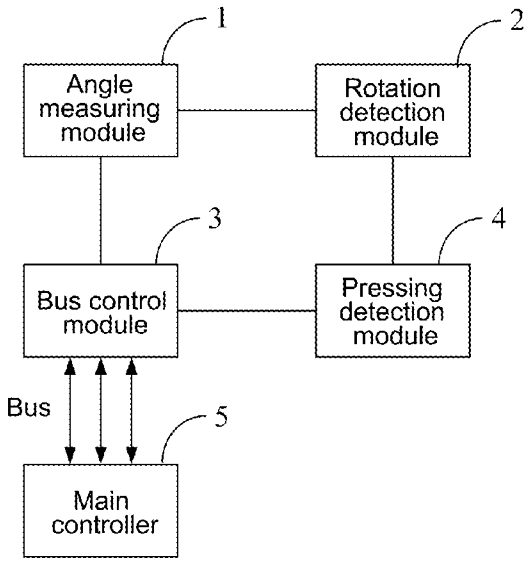
FIG. 4 is a schematic diagram of a detection device for the crown of a smart watch provided in an embodiment of the present disclosure.

Referring to FIG. 4, FIG. 4 is a structural schematic diagram of a detection device for the crown of a smart watch provided in an embodiment of the present disclosure. Herein, the angle measuring module 1 in the present embodiment detects the rotation angle by an opto-sensor. The angle measuring module 1 includes a light emission unit and a light reception unit. The light emission unit is configured to emit detection light to a side surface of the shaft of the crown. The light reception unit is configured to receive the detection light reflected by the side surface of the shaft, and obtain the measured rotation angle according to change in light characteristics of the received detection light. In the above, the light characteristics of the detection light reflected by the side surface of the shaft are associated with a rotation position of the shaft.

In the embodiments of the present disclosure, the crown of smart watch includes the shaft and the key. Page-turning, up and down regulation, hand adjustment and so on can be performed by rotating the shaft. The angle measuring module 1 of the detection device is configured to detect the rotation angle of the shaft of the crown. The angle measuring module 1 further includes the light emission unit and the light reception unit. The light emission unit emits the detection light to the side surface of the shaft, and then the detection light reflected by the side surface of the shaft is detected by the light reception unit. The light emission unit may be a chip of a vertical-cavity surface-emitting laser (VCSEL) or of an LED, etc. The emitted detection light may be one or more of blue light, red light, green light, and infrared light. The light reception unit receives the detection light emitted by the light emission unit and reflected by the side surface of the shaft, and obtains the rotation angle of the shaft according to the change in light characteristics. The detection device in the present embodiment has high identification precision by identifying the rotation angle through optical detection, and the opto-sensor used to detect light occupies a smaller volume compare to the mechanical encoder.

Specifically, the light characteristics of the detection light can be obtained by applying black and white stripes to the side surface of the shaft. When the shaft is rotated, reflected and non-reflected light appear alternately, then the light reception unit accordingly receives the detection light intermittently, and outputs discontinuous electrical signals, thus the rotation angle of the shaft is obtained according to the intermittent electrical signals.

In some other embodiments, the angle measuring module 1 may also detect the rotation angle of the shaft by a high-precision encoder.

With continued reference to FIG. 3 and FIG. 4, the angle measuring module 1 further includes a packaging shell and a PCB substrate. The packaging shell and the PCB substrate form a first cavity and a second cavity. The first cavity accommodates the light emission unit. The second cavity accommodates the light reception unit. In the embodiments of the present disclosure, the light emission unit and the light reception unit are placed on the PCB substrate, then with the first cavity and the second cavity formed by the packaging shell and the PCB substrate, the light emission unit is placed in the first cavity, and the light reception unit is placed in the second cavity. The packaging shell is used to protect the light emission unit and the light reception unit.

The first cavity is formed with a first aperture and the second cavity is formed with a second aperture. The detection light emitted by the light emission unit arrives at the side surface of the shaft through the first aperture, and the detection light reflected by the side surface of the shaft arrives at the light reception unit through the second aperture. In the embodiments of the present disclosure, by forming the first aperture and the second aperture at corresponding positions of the first cavity and the second cavity respectively, when the detection light emitted by the light emission unit arrives at the side surface of the shaft through the first aperture, the detection light reflected by the side surface of the shaft also arrives at the light reception unit through the second aperture.

In some optional embodiments, the packaging shell is made of an opaque material to shield light. In the embodiments of the present disclosure, the packaging shell is made of an opaque plastic material, ceramic, or similar materials, so as to shield all light. Thus, external light cannot affect the light reception unit, and the detection light emitted by the light emission unit can be transmitted along a preset path (the light emission unit—the first aperture—the side surface of the shaft—the second aperture—the light reception unit).

In some optional embodiments, an optical detection module further includes a first filter unit. The first filter unit, disposed between the light emission unit and the first aperture, is configured to shield external light and enable the detection light emitted by the light emission unit to pass through. In the embodiments of the present disclosure, the first filter unit is disposed at the position of the first aperture. The first filter unit may be made of glass with a filter coating or other materials, and also may be a lens in a characteristic shape, which enables the light emitted by the light emission unit to pass through, while other external light cannot pass through. Moreover, the first filter unit is placed in the first cavity in the present embodiment, to protect the first filter unit with the packaging shell.

In some optional embodiments, the optical detection module further includes a second filter unit. The second filter unit, disposed between the light reception unit and the second aperture, is configured to shield external light, and enable the detection light emitted by the light emission unit and reflected by the side surface of the shaft to pass through. In the embodiments of the present disclosure, the second filter unit is disposed at the position of the second aperture. The second filter unit may be made of glass with a filter coating or other materials, and also may be a lens in a characteristic shape, which enables the detection light emitted by the light emission unit and reflected by the side surface of the shaft to pass through, while other external light cannot pass through. Moreover, in the present embodiment, the second filter unit is placed in the second cavity to protect the second filter unit by the packaging shell.

In some optional embodiments, the optical detection module has both the first filter unit and the second filter unit.

In FIG. 3, the second filter unit is placed on a top surface of the light reception unit, and the first filter unit is placed on a top surface of the light emission unit. In some other embodiments, the first filter unit can also be placed at the first aperture, and the second filter unit can also be placed at the second aperture.

Figure 5:
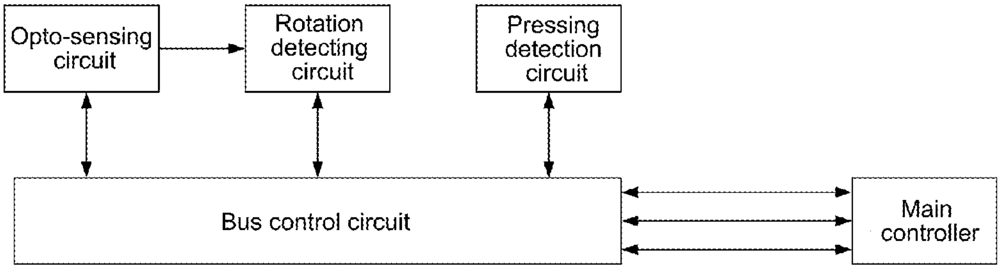
FIG. 5 is a circuit module diagram of the detection device for a crown.

Referring to FIG. 5, FIG. 5 is a diagram of a circuit module of the detection device for a crown. In the above, the light reception unit includes an opto-sensing circuit and a rotation detecting circuit. An output of the opto-sensing circuit is connected to the input of the rotation detecting circuit.

In the above, the opto-sensing circuit is configured to receive the detection light reflected by the side surface of the shaft, and sense the light characteristics. The rotation detecting circuit is configured to obtain the rotation angle of the shaft according to the change in the light characteristics.

In the embodiments of the present disclosure, the light emission unit emits the detection light to the side surface of the shaft. The detection light is reflected to the light reception unit, and is sensed by the opto-sensing circuit of the light reception unit. The opto-sensing circuit senses and transmits the light characteristics of the detection light to the rotation detecting circuit. Since the light characteristics are related to the rotational position of the shaft, the rotation detecting circuit obtains change in the rotational position of the shaft according to the change in the light characteristics, i.e., the rotation angle of the shaft is obtained. The rotation angle of the shaft is stored in the memory of the detection device for a crown, and then can be read out and used by the main controller of the smart watch via the bus. When change in the rotation angle of the shaft is detected, the detection device for a crown may also generate a level or pulse change through an interrupt pin on the bus to inform the main controller, so that the main controller controls page-turning, up and down regulation, hand adjustment or the like in time according to the rotation angle of the shaft.

In some optional embodiments, the detection device further includes a pressing detection circuit for detecting a key state of the crown. The pressing detection circuit is configured to output signals of different levels when the key is pressed or not. In the embodiments of the present disclosure, the optical detection module only identifies the rotation angle of the shaft, while the pressing detection circuit is separately provided to detect the key on the crown, so that a process of identifying the rotation angle of the shaft and a process of detecting the key are carried out independently, thereby the following effects can be achieved.

If it is configured in such a way that when the pressing action on the key is detected first, and the rotation angle of the shaft is not identified in the process of pressing the key (for example, within 0.5 seconds when detecting change in the key state), the misrotation caused to the shaft in the process of pressing the key can be avoided from being identified.

If it is configured in such a way that when the rotation action on the shaft is detected first, the pressing detection is not carried out during the continuous rotation of the shaft, then the action of mistakenly pressing the key during the rotation of the shaft can be avoided from being identified.

Specifically, after the key is pressed, the pressing detection circuit causes a level change on the corresponding pin to detect a change in the key state.

Figure 6:
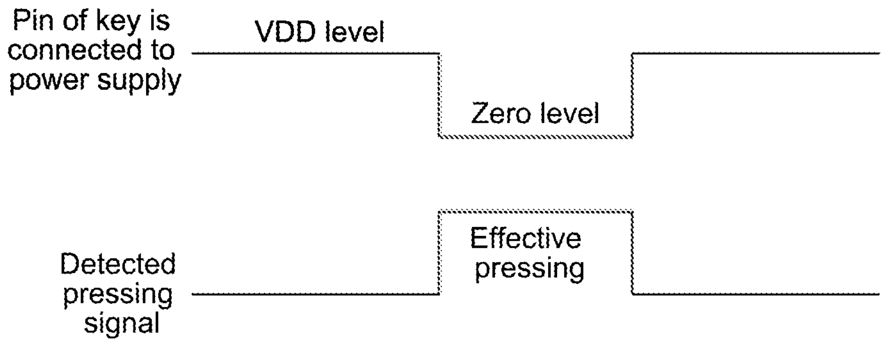
FIG. 6 is a signal waveform provided in an embodiment of the present disclosure when the pin of key is connected to a power supply.

For example, one end of the key is connected to the power supply, and the other end of the key is an output of the pressing detection circuit. As shown in FIG. 6, when the pressing action on the key does not occur, a switch of the key is in the open state, and the pressing detection circuit outputs a pull-down level (e.g. zero level) with weaker intensity. When the pressing action on the key occurs, the switch of the key is in a closed state, the output of the pressing detection circuit is pulled to power supply level VDD, and then the pressing action on the key can be identified by detecting a level value or level change at this time.

Figure 7:
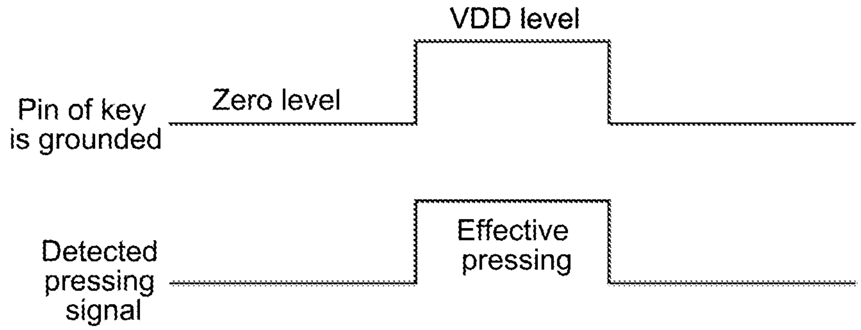
FIG. 7 is a signal waveform when the pin of the key is grounded provided in an embodiment of the present disclosure.

Similarly, another case is that the first end of the key is grounded, and the second end of the key is connected to a pull-up level (such as power supply VDD) with weaker intensity, and the second end of the key is the output of the pressing detection circuit. As shown in FIG. 7, when the pressing action on the key does not occur, the switch of the key is in the open state, and the pressing detection circuit outputs pull-up level. When the pressing action on the key occurs, the switch of the key is in the closed state, the output of the pressing detection circuit is reduced to zero level, and then the pressing action on the key can be identified by detecting a level value or level change at this time.

Moreover, the change in the key state is stored in the memory of the detection device for a crown, and is read out and used by the main controller of the smart watch via the bus. When the change in the key state is detected, the detection device for a crown may also generate a level or pulse change through the interrupt pin on the bus to inform the main controller, so that the main controller performs control in time in response to the change in the key state.

In some optional embodiments, the detection device for a crown further includes a bus control circuit connected to the opto-sensing circuit, the rotation detecting circuit, and the pressing detection circuit, respectively. The bus control circuit is configured to receive a control signal from the main controller, and send to the main controller a detection result signal of the rotation detecting circuit and/or the pressing detection circuit. The bus control circuit is further configured to be connected to the main controller via an $I^2C$ or SPI bus.

In the above, the $I^2C$ bus is a simple, bidirectional two-wire synchronous serial bus, only needs two wires to transmit information between devices connected to the bus. A master device is a device configured to start the bus to transmit data and generate a clock to open the transmission, and in this case, any addressed device is considered as a slave device. Master-slave relationship and transmit-receive relationship on the bus are not fixed, but depends on a data transmission direction at that time. If a host is to send data to the slave device, the host first addresses the slave device, and then actively sends data to the slave device, and finally data transmission is terminated by the host. If the host is to receive data from the slave device, the slave device is first addressed by the master device, then the host receives data sent from the slave device, and finally reception process is terminated by the host.

The SPI bus is a full-duplex synchronous serial bus, and is a synchronous serial port for communication between a microcontroller unit (MCU) and a peripheral device. The SPI bus is mainly applied between memory, real time clock (RTC), digital-to-analog converter (ADC), network controller, MCU, digital signal processor (DSP), and digital signal decoder. An SPI system can directly interface with many standard peripheral means produced by various manufacturers, and generally uses four lines: serial clock line SCK, master input/slave output MISO, master output/slave input MOSI, and active-low slave selection line SSEL.

In the embodiments of the present disclosure, the means for the rotation detection of the shaft and the means for the pressing detection are connected to the bus control circuit, and then they are connected to the main controller of the smart watch via the bus control circuit, as shown in FIG. 2, which omits a connection line between the pressing detection circuit and the main controller, reduces hardware costs and facilitates layout of an internal space of the smart watch, saves the detection pin of the main controller, and avoids that the pressing detection of the main controller occupies computing resources of the main controller. Modules for the pressing detection and the rotation detection of the shaft are connected to the main controller via the bus, which also avoids the time difference between the pressing detection and the rotation detection of the shaft.

In the embodiments of the present disclosure, the measured rotation angle obtained by the angle measuring module 1 and the detection result of the pressing detection module 4 are transmitted to the rotation detection module 2. After that, the rotation detection module 2 eliminates the misrotation angle from the measured rotation angle, specifically including: if an absolute value of a ratio of the measured rotation angle to a misrotation threshold is less than 1, and the ratio detected each time within the set period of time is randomly distributed within a range with an absolute value less than 1, the true rotation angle is identified as 0.

If the ratio of the measured rotation angle to the misrotation threshold TH is greater than N−1 and less than N+1, and the ratio detected each time within certain time in the set period of time is randomly distributed within a range greater than N−1 and less than N+1, wherein N is a positive integer greater than 0, the true rotation angle is identified as N×TH.

In addition, the rotation detection module 2 is also configured to realize high-precision measurement of the rotation angle of the crown, specifically including: reading the measured rotation angle n times continuously beyond the set period of time, where n is a positive integer greater than 1; and performing polynomial fitting on the n measured rotation angles to obtain an optimal rotation angle value, and taking the optimal rotation angle value as the detection result. Specifically, n measured rotation angles x1, x2 . . . xn are subjected to the polynomial fitting to obtain the optimal rotation angle value, i.e., the n measured rotation angles x1, x2 . . . xn are substituted into $y=a0+a1\times x+a2\times x2+a3\times x3+\ldots+an\times x^n$ to obtain a0, a1, a2 . . . an, then the polynomial is subjected to derivation and then an extremum is found, to obtain a corresponding x value, i.e., the optimal rotation angle value. Since x can be a decimal with any number of digits, the rotation angle can be identified at very high precision.

In some optional embodiments, the detection device for a crown further includes: a bus control module 3, connected to the angle measuring module 1 and the pressing detection module 4, and configured to receive a control signal of the main controller 5 and send to the main controller 5 the detection result of the rotation action and/or the pressing action.

In the embodiments of the present disclosure, both angle measuring module 1 and the pressing detection module 4 are connected to the bus control module 3, and then are connected to the main controller 5 of the smart watch via the bus control module 3. The connection line between the pressing detection module 4 and the main controller 5 is omitted, thus, the detection pin of the main controller 5 is saved, computing resources of the main controller 5 for the pressing detection are also saved, and the time difference between the pressing detection and the rotation detection of the shaft is also avoided. In the above, the bus includes an $I^2C$ or SPI bus.

Figure 8:
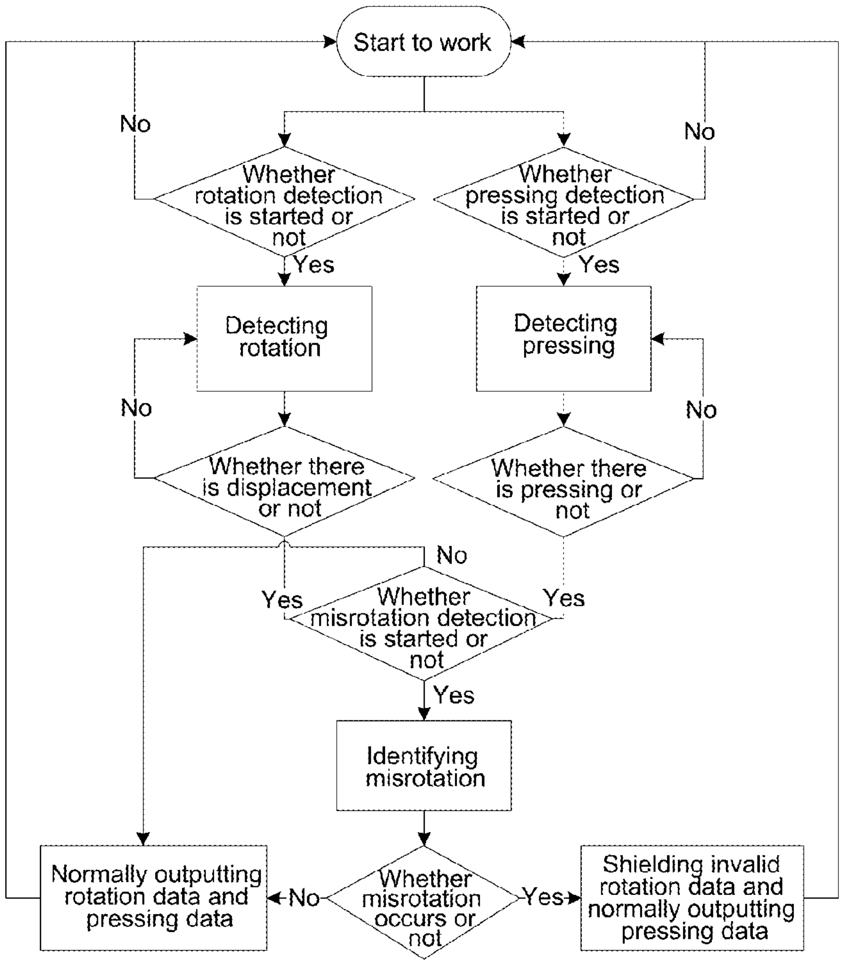
FIG. 8 is a work flowchart of a detection device according to an embodiment of the present disclosure.

Referring to FIG. 8, FIG. 8 is a work flowchart of the detection device according to an embodiment of the present disclosure. When the detection device for a crown starts to work, the angle measuring module 1 performs the rotation detection, and the pressing detection module 4 performs the pressing detection. If the pressing detection module 4 detects the pressing action, and the angle measuring module 1 also detects the measured rotation angle, the rotation detection module 2 detects the misrotation for the measured rotation angle, and eliminates the misrotation angle from the measured rotation angle, so as to shield invalid rotation data and output the true rotation angle and pressing data.

Figure 9:
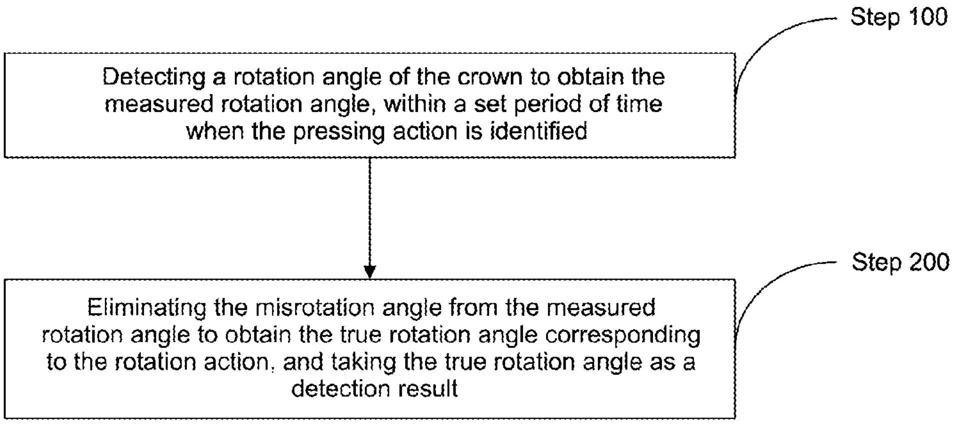
FIG. 9 is a flowchart of steps of a rotation detecting method for a crown provided in an embodiment of the present disclosure.

Referring to FIG. 9, FIG. 9 is a flowchart of steps of a rotation detecting method for a crown provided in an embodiment of the present disclosure. Operations of the user on the crown include the pressing action and the rotation action. The method specifically includes:

- step 100, detecting a rotation angle of the crown to obtain the measured rotation angle within a set period of time when the pressing action is identified; and
- step 200, eliminating the misrotation angle from the measured rotation angle, to obtain the true rotation angle corresponding to the rotation action, and taking the true rotation angle as a detection result.

In the embodiments of the present disclosure, considering factors such as jittering of human hand or shaking of the crown itself when the crown is pressed, the misrotation of the shaft of the crown occurs. Since the misrotation is not a correct rotation action, accurate rotation angle data can only be provided by eliminating the misrotation. Therefore, in the present embodiment, the misrotation angle is eliminated from all the measured rotation angles, within the set period of time during which the pressing action has a continuous impact on the rotation detection when the pressing action on the crown is identified, to obtain the true rotation angle corresponding to the rotation action, thus improving the detection accuracy of the rotation angle of the crown.

In the above, the step of eliminating the misrotation angle from the measured rotation angle, to obtain the true rotation angle corresponding to the rotation action specifically includes the following four cases.

A first case is that no effective rotation is performed during the pressing action.

Figure 10:
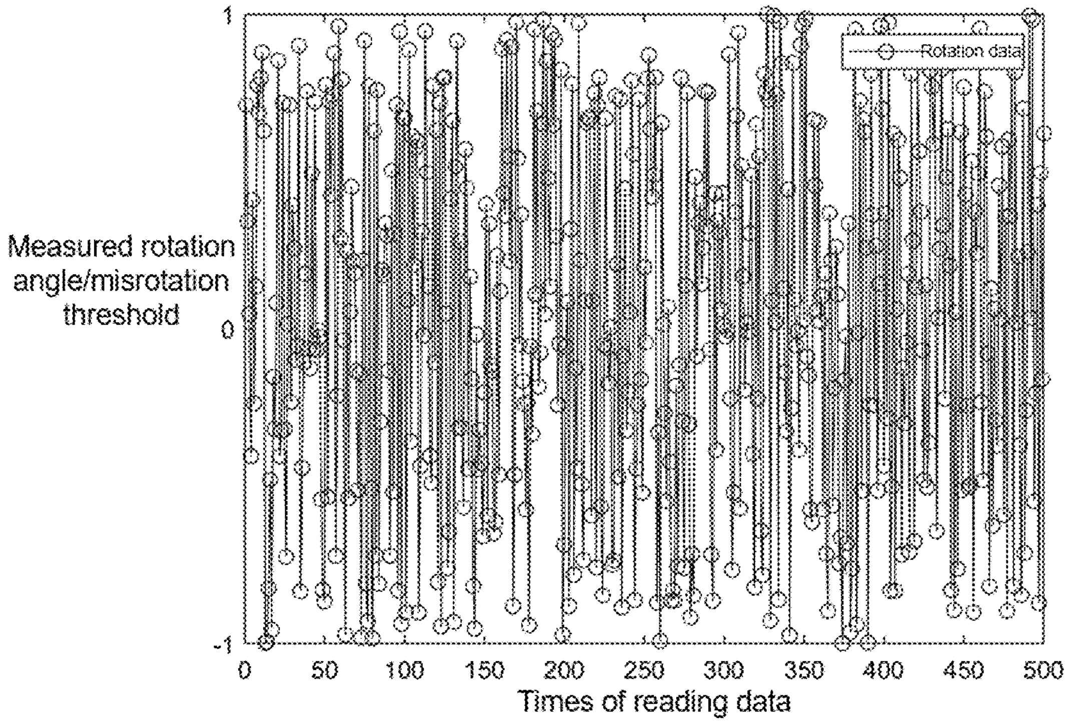
FIG. 10 is a ratio data waveform graph for the first case according to an exemplary embodiment.

As shown in FIG. 10, if the absolute value of the ratio of the measured rotation angle to the misrotation threshold is less than 1, and the ratio detected each time within the set period of time is randomly distributed within a range with an absolute value less than 1, the true rotation angle is identified as 0.

In the above, a magnitude of the misrotation threshold is set as follows: the magnitude of the misrotation threshold is related to a shaft structure, where the more stable the shaft structure is, the less the shaking during the pressing is, and the smaller the misrotation threshold is; otherwise, the more unstable the shaft structure is, the greater the misrotation threshold is. The magnitude of the misrotation threshold is also related to resistance to the shaft rotation, where the greater the resistance to shaft rotation is, the smaller the misrotation threshold is; otherwise, the smaller the resistance to the shaft rotation is, the greater the misrotation threshold is.

In the embodiments of the present disclosure, during the duration of the pressing action of pressing the crown, there is a case where the user fails to perform effective rotation, that is, the true rotation angle is 0, and in this case, the detected measured rotation angle is actually the misrotation angle, and the misrotation data are randomly distributed in positive and negative directions at different moments during the pressing. Therefore, in the present embodiment, if the absolute value of the ratio of the measured rotation angle to the misrotation threshold is smaller than 1, and the ratio detected each time within the set period of time is randomly distributed within the range with the absolute value less than 1, the true rotation angle is identified as 0.

A second case is that effective rotation is simultaneously performed during the pressing action.

Figure 11:
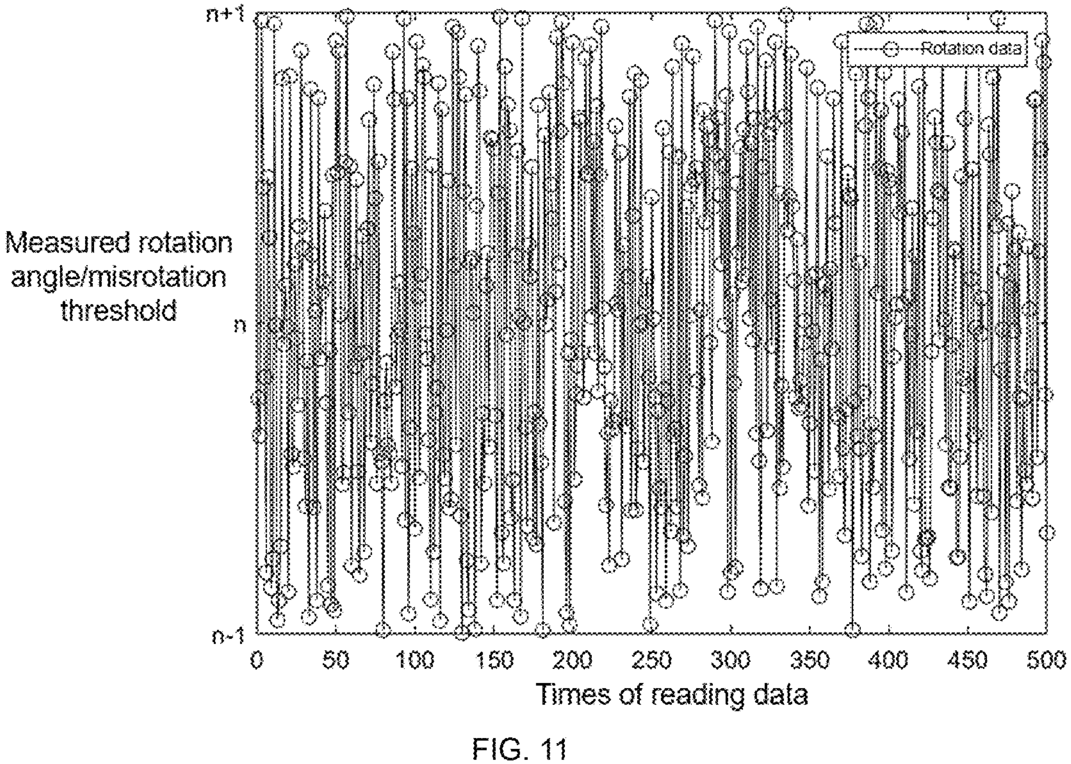
FIG. 11 is a ratio data waveform graph for the second case according to an exemplary embodiment.

As shown in FIG. 11, if the ratio of the measured rotation angle to the misrotation threshold TH is greater than N−1 and less than N+1, and the ratio detected each time within certain time in the set period of time is randomly distributed within a range greater than N−1 and less than N+1, the true rotation angle is identified as N×TH, where N is a positive integer greater than 0.

In the embodiments of the present disclosure, during the duration of the pressing action of crown, there exists a case where the user performs effective rotation at the same time, i.e., the true rotation angle is not 0, in this case, the detected measured rotation angle actually is a sum of the misrotation angle and the true rotation angle, and the misrotation data are randomly distributed in the positive and negative directions at different moments during the pressing. Therefore, in the present embodiment, if the ratio of the measured rotation angle to the misrotation threshold TH is greater than N−1 and less than N+1, and the ratio detected each time within certain time in the set period of time is randomly distributed within a range greater than N−1 and less than N+1, the true rotation angle is identified as N×TH.

A third case is that variable-deceleration rotation is simultaneously performed during the pressing action.

Figure 12:
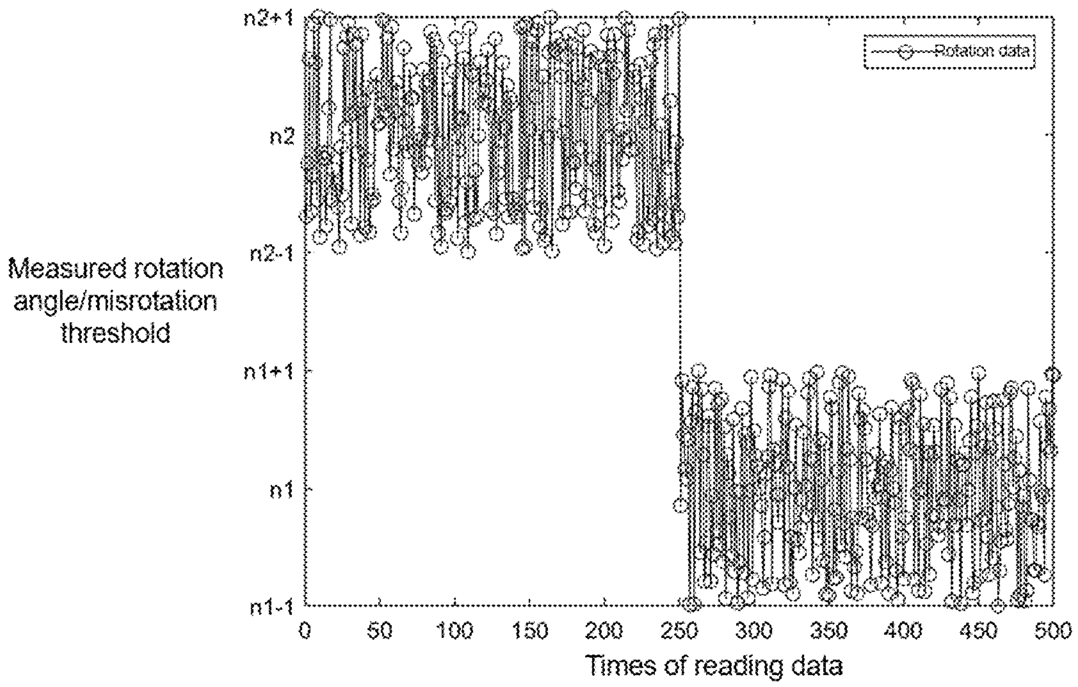
FIG. 12 is a ratio data waveform graph for the third case according to an exemplary embodiment.

As shown in FIG. 12, when the measured rotation angle is read for the first 250 times, the ratio of the measured rotation angle to the misrotation threshold TH is greater than N2−1 and less than N2+1, and the ratio detected each time within certain time in the set period of time is randomly distributed within a range greater than N2−1 and less than N2+1, then the true rotation angle is identified as N2×TH. When the measured rotation angle is read for the next 250 times, the ratio of the measured rotation angle to the misrotation threshold TH is greater than N1−1 and less than N1+1, and the ratio detected each time within certain time in the set period of time is randomly distributed within a range greater than N1−1 and less than N1+1, then the true rotation angle is identified as N1×TH. In the above, N2 is greater than N1, which means, the rotation speed in the former period is faster than that of the later period.

A fourth case is that variable-acceleration rotation is simultaneously performed during the pressing action.

Figure 13:
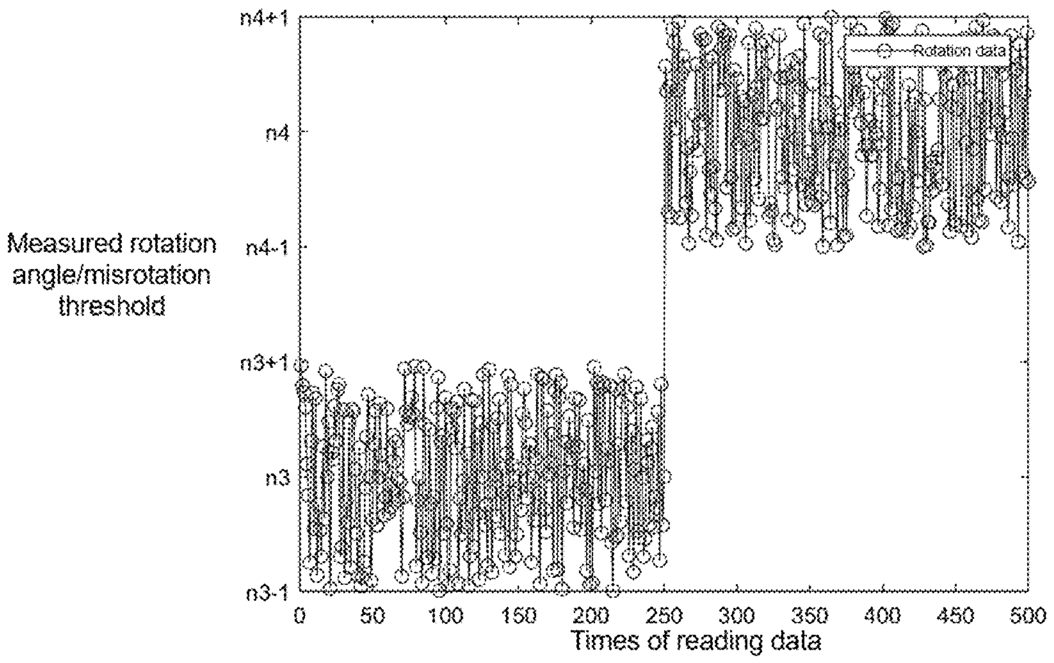
FIG. 13 is a ratio data waveform graph for the fourth case according to an exemplary embodiment.

As shown in FIG. 13, when the measured rotation angle is read for the first 250 times, the ratio of the measured rotation angle to the misrotation threshold TH is greater than N3−1 and less than N3+1, and the ratio detected each time within certain time in the set period of time is randomly distributed within a range greater than N3−1 and less than N3+1, then the true rotation angle is identified as N3×TH. When the measured rotation angle is read for the next 250 times, the ratio of the measured rotation angle to the misrotation threshold TH is greater than N4−1 and less than N4+1, and the ratio detected each time within certain time in the set period of time is randomly distributed within the range greater than N4−1 and less than N4+1, then the true rotation angle is identified as N4×TH. In the above, N4 is greater than N3, which means, the rotation speed in the later period is faster than that of the former period.

In some optional embodiments, the rotation detecting method further includes: reading the measured rotation angle n times continuously beyond the set period of time, wherein n is a positive integer greater than 1; and performing polynomial fitting on n measured rotation angles, to obtain the optimal rotation angle value, and taking the optimal rotation angle value as the detection result.

In the embodiments of the present disclosure, data are read quickly all the time during the rotation of the crown, algorithm of polynomial fitting is performed on the n measured rotation angles read continuously, so as to obtain the optimal rotation angle value. The optimal rotation angle may be a decimal with any number of digits, and tiny angle rotation information can be identified, thereby realizing the high-precision detection of the rotation angle.

In the embodiments provided in the present disclosure, it should be understood that the device and the method disclosed may be implemented in other modes. The device embodiments described in the above are merely exemplary, for example, the units are merely divided according to logical functions, but they may be divided in other ways in practical implementation. For another example, multiple units or components may be combined or may be integrated into another system, or some features may be omitted, or not executed. In addition, mutual coupling or direct coupling or communication connection as shown or discussed may be realized via some communication interfaces, and indirect coupling or communication connection between means or units may be in an electrical form, a mechanical form or other forms.

In addition, the units described as separate components may be or may not be physically separated. The components shown as units may be or may not be physical units, i.e., they may be located at one place or distributed onto multiple network units. Some or all of the units can be selected as actually needed to achieve objectives of the solutions in the embodiments.

Furthermore, individual functional modules in various embodiments of the present disclosure may be integrated together to form an independent part, or each module may exist alone, or two or more modules may be integrated to form an independent part.

Herein, the relational terms such as first and second are used only to distinguish one entity or operation from another entity or operation, rather than necessarily requiring or implying any such actual relationship or sequence between these entities or operations.

The aforementioned examples are provided as embodiments of the present disclosure and are not meant to restrict the scope of protection for the present disclosure. For those skilled in the art, the present disclosure might have various changes and variations. Any modifications, equivalent substitutions, improvements and the like made within the spirit and principle of the present disclosure should be covered within the scope of protection of the present disclosure.

The invention claimed is:

1. A rotation detecting method for a crown, wherein operations on the crown comprise a pressing action and a rotation action, and the method comprises:

detecting, within a set period of time when the pressing action is identified, a rotation angle of the crown to obtain a measured rotation angle; and eliminating a misrotation angle from the measured rotation angle to obtain a true rotation angle corresponding to the rotation action, and taking the true rotation angle as a detection result, wherein the misrotation angle is a first rotation angle detected within a set period of time after a pressing operation; and the true rotation angle is a second rotation angle not including the first rotation angle to determine the detection result.

2. The method according to claim 1, wherein the step of eliminating a misrotation angle from the measured rotation angle to obtain a true rotation angle corresponding to the rotation action comprises:

identifying the true rotation angle as 0, if an absolute value of the ratio of the measured rotation angle to a misrotation threshold detected each time within the set period of time is less than 1.

3. The method according to claim 1, wherein the step of eliminating a misrotation angle from the measured rotation angle to obtain a true rotation angle corresponding to the rotation action comprises:

identifying the true rotation angle as N×TH, if the ratio of the measured rotation angle to a misrotation threshold TH detected each time within certain time in the set period of time is greater than N-1 and less than N+1, wherein N is a positive integer greater than 0.

4. The method according to claim 1, further comprises:

reading the measured rotation angle n times continuously beyond the set period of time, wherein n is a positive integer greater than 1; and performing polynomial fitting on n measured rotation angles to obtain an optimal rotation angle value, and taking the optimal rotation angle value as the detection result.

5. A detection device for the crown of a smart watch, wherein operations on the crown comprise a pressing action and a rotation action, and the detection device comprises:

an angle measuring module, configured to detect a rotation angle of the crown to obtain a measured rotation angle;

a pressing detection module, configured to detect a pressing action on the crown; and a rotation detection module, connected to the angle measuring module and the pressing detection module, and configured to eliminate, within a set period of time when the pressing action is identified, a misrotation angle from the measured rotation angle to obtain a true rotation angle corresponding to the rotation action, which is taken as a detection result, wherein the misrotation angle is a first rotation angle detected within a set period of time after a pressing operation; and the true rotation angle is a second rotation angle not including the first rotation angle to determine the detection result.

6. The device according to claim 5, wherein the angle measuring module comprises:

a light emission unit, configured to emit detection light to a side surface of a shaft of the crown; and a light reception unit, configured to receive the detection light reflected by the side surface of the shaft, and obtain the measured rotation angle according to change in light characteristics of the received detection light, wherein the light characteristics of the detection light reflected by the side surface of the shaft are associated with a rotation position of the shaft.

7. The device according to claim 6, wherein the angle measuring module further comprises a packaging shell and a PCB substrate;

the packaging shell and the PCB substrate form a first cavity and a second cavity; and the first cavity accommodates the light emission unit, and the second cavity accommodates the light reception unit.

8. The device according to claim 7, wherein the first cavity is formed with a first aperture, and the second cavity is formed with a second aperture; and the light emission unit emits the detection light to the side surface of the shaft through the first aperture, and the light reception unit receives the detection light reflected by the side surface of the shaft through the second aperture.

9. The device according to claim 8, wherein the packaging shell comprises an opaque material surrounding the packaging shell.

10. The device according to claim 8, wherein the angle measuring module further comprises:

a first filter unit, disposed between the light emission unit and the first aperture, and configured to shield external light, and enable the detection light emitted by the light emission unit to pass through.

11. The device according to claim 10, wherein the angle measuring module further comprises:

a second filter unit, disposed between the light reception unit and the second aperture, and configured to shield external light, and enable the detection light emitted by the light emission unit and reflected by the side surface of the shaft to pass through.

12. The device according to claim 11, wherein the first filter unit is glass with a filter coating or a lens; and/or the second filter unit is glass with a filter coating or a lens.

13. The device according to claim 5, further comprises a pressing detection circuit for detecting a key state of the crown, wherein the pressing detection circuit is configured to output signals of different levels when a key is pressed or not.

14. The device according to claim 13, wherein the light reception unit comprises an opto-sensing circuit and a rotation detecting circuit; and the opto-sensing circuit is connected to the rotation detecting circuit;

the opto-sensing circuit is configured to receive the detection light reflected by the side surface of the shaft, and sense light characteristics; and the rotation detecting circuit is configured to obtain the rotation angle of the shaft according to change in the light characteristics.

15. The device according to claim 14, further comprising:

a bus control circuit, connected to the opto-sensing circuit, the rotation detecting circuit, and the pressing detection circuit, respectively, wherein the bus control circuit is configured to receive a control signal of a main controller, and send a detection result signal of the rotation detecting circuit and/or the pressing detection circuit to the main controller.

16. The device according to claim 15, wherein the bus control circuit is further configured to be connected to the main controller via an $I^2C$ or SPI bus.

17. The device according to claim 5, wherein the rotation detection module is further configured to:

identify the true rotation angle as 0, if an absolute value of a ratio of the measured rotation angle to a misrotation threshold detected each time within the set period of time is less than 1.

18. The device according to claim 5, wherein the rotation detection module is further configured to:

identify the true rotation angle as N×TH, if a ratio of the measured rotation angle to a misrotation threshold TH detected each time within certain time in the set period of time is greater than N-1 and less than N+1, wherein N is a positive integer greater than 0.

19. The device according to claim 5, wherein the rotation detection module is further configured to:

read the measured rotation angle n times continuously beyond the set period of time, wherein n is a positive integer greater than 1; and perform polynomial fitting on n measured rotation angles to obtain an optimal rotation angle value, and take the optimal rotation angle value as the detection result.

20. The device according to claim 5, further comprises:

a bus control module, connected to the angle measuring module and the pressing detection module, and configured to receive a control signal of a main controller, and send the detection result of the rotation action and/or the pressing action to the main controller.

* * * * *